US012736028B2

(12) United States Patent
Engels

(10) Patent No.: US 12,736,028 B2
(45) Date of Patent: Sep. 15, 2026

(54) METHOD AND CONTROLLER ARRANGEMENT FOR OPERATING A WIND TURBINE FARM

(71) Applicant: Nederlandse Organisatie voor toegepast-natuurwetenschappelijk Onderzoek TNO, The Hague (NL)

(72) Inventor: Wouter Peter Engels, The Hague (NL)

(73) Assignee: Nederlandse Organisatie voor toegepast-natuurwetenschappelijk Onderzoek TNO, The Hague (NL)

( * ) Notice: Subject to any disclaimer, the term of this patent is extended or adjusted under 35 U.S.C. 154(b) by 99 days.

(21) Appl. No.: 18/043,066

(22) PCT Filed: Sep. 3, 2021

(86) PCT No.: PCT/EP2021/074377
§ 371 (c)(1),
(2) Date: Feb. 27, 2023

(87) PCT Pub. No.: WO2022/049251
PCT Pub. Date: Mar. 10, 2022

(65) Prior Publication Data

US 2023/0323857 A1 Oct. 12, 2023

(30) Foreign Application Priority Data

Sep. 3, 2020 (EP) .................................... 20194389

(51) Int. Cl.
*F03D 7/04* (2006.01)
*F03D 7/02* (2006.01)
*F03D 9/25* (2016.01)

(52) U.S. Cl.
CPC ........... *F03D 7/048* (2013.01); *F03D 7/0204* (2013.01); *F03D 7/0224* (2013.01);
(Continued)

(58) Field of Classification Search
CPC ...... F03D 7/048; F03D 7/0204; F03D 7/0224; F03D 7/0276; F03D 9/25; F03D 7/028;
(Continued)

(56) References Cited

U.S. PATENT DOCUMENTS 10,539,116 B2 * 1/2020 Davoust .................. G01S 17/95
2006/0131889 A1 * 6/2006 Corten .................... F03D 13/20
290/43

(Continued)

FOREIGN PATENT DOCUMENTS

EP 3613982 A1 2/2020
GB 2534578 A 8/2016

OTHER PUBLICATIONS

Porté-Agel, Fernando et al: “Wind-Turbine and Wind-Farm Flows: A Review”, Boundary Layer Meteorology, Reidel, Dordrecht, NL, vol. 174, No. 1, Sep. 20, 2019, pp. 1-59, XP036981082.

(Continued)

*Primary Examiner* — Matthew T Largi
(74) *Attorney, Agent, or Firm* — Ipsilon USA—NLO

(57) ABSTRACT

Operating a wind turbine farm. Each wind turbine of the turbine farm includes a tower, a generator system for generating electric power and a rotor provided with a number of rotor blades on a rotor axis coupled to the electric generator for driving the generator, the rotor being arranged on the tower. The method includes: providing a wind turbine farm control for controlling operational parameters for each of the wind turbines; providing a vertical wind shear profile located above a level of the rotors of the wind turbines; based on a value of the vertical wind shear profile determining an adjustment of operational parameters for each of the wind turbines such that a yield of electric power of the wind turbine farm is optimized with respect to the vertical wind shear profile, and adapting the operational parameters
(Continued)

of the one or more wind turbines according to the adjustment.

12 Claims, 3 Drawing Sheets

(52) U.S. Cl.
CPC ............. *F03D 7/0276* (2013.01); *F03D 9/25* (2016.05); *F05B 2220/706* (2013.01); *F05B 2270/321* (2013.01); *F05B 2270/8042* (2013.01)

(58) Field of Classification Search
CPC .......... F05B 2220/706; F05B 2270/321; F05B 2270/8042; F05B 2270/1033; F05B 2270/20
See application file for complete search history.

(56) References Cited

U.S. PATENT DOCUMENTS

2006/0179934 A1 8/2006 Smith et al.
2010/0092292 A1* 4/2010 Nies ........................ F03D 7/042 416/41
2010/0140936 A1* 6/2010 Benito .................... F03D 17/00 290/44
2012/0169053 A1* 7/2012 Tchoryk, Jr. ............ G01S 7/491 356/28
2013/0209220 A1* 8/2013 Nielsen ................. F03D 7/0296 415/119
2014/0219795 A1* 8/2014 Honhoff ................ F03D 7/0204 416/9
2015/0071778 A1* 3/2015 Delport ................. F03D 7/0224 416/61
2015/0276786 A1* 10/2015 Zuo ......................... G01S 17/58 290/55
2015/0308413 A1* 10/2015 Bhaskar .................. F03D 9/257 290/44
2018/0045182 A1 2/2018 Westergaard
2018/0246138 A1* 8/2018 Holtom ................. G01S 13/956

OTHER PUBLICATIONS

Bleeg, James, Mark Purcell, Renzo Ruisi, and Elizabeth Traiger. 2018. “Wind Farm Blockage and the Consequences of Neglecting Its Impact on Energy Production” Energies 11, No. 6: 1609.
A R Meyer Forsting and N Troldborg 2015 J. Phys.: Conf. Ser. 625 012029.

* cited by examiner 100
10
35
50
30
40
D
20
10
10

200
230
Wind Shear measurement
Wind Shear profile
220
202
input
other parameters
240
processor
memory
208
206
207
204
output
Wind turbine farm control
210

METHOD AND CONTROLLER ARRANGEMENT FOR OPERATING A WIND TURBINE FARM

FIELD OF THE INVENTION

The present invention relates to a method for operating a wind turbine farm. Also, the invention relates to a controller for operating a wind turbine farm. In addition, the invention relates to a wind turbine farm arranged with such a controller and to controller software for carrying out the method.

BACKGROUND ART

Wind turbines are designed to capture energy optimally in free, undisturbed wind, generally assuming an exponential vertical wind shear. In the design of wind turbine farms, these wind turbines are generally placed such that the wake effects of wind turbines are as small as possible, given the available space.

First, the models that are used for the design of those wind farms generally assume that two turbines that are situated next to each other in the wind do not influence each other. However, it is known that in reality there is some influence, which is known as a 'blockage' effect. In that case a whole wind turbine farm forms a sufficient obstacle in the wind for a wind flow to be deflected up and around the wind farm. This will reduce the power production of the wind turbine farm as a whole compared to the model. The phenomenon of wind farm blockage and its effects on power production are for example described by Bleeg et al. (Energies 2018, 11, 1609) and by Forsting et al. ("*The effect of blockage on power production for laterally aligned wind turbines*", Journal of Physics: Conference Series (Online), 625).

Second, these models still assume that the vertical wind shear profile is a standard profile. It is known that a significant amount of the time, this is not the case. There may be significantly higher or lower wind shear or even inverse speed or low-level jets. All of these situations will influence the amount of energy that can be collected in a wind turbine farm.

Although there are control methods available to reduce the influence of wakes of wind turbines amongst each other, these methods do not address the blockage effect, or take other wind shear profiles into account.

It is an objective of the invention to mitigate or overcome the disadvantages from the prior art.

SUMMARY OF THE INVENTION

The objective is achieved by a method for operating a wind turbine farm comprising a plurality of wind turbines arranged together in a wind turbine farm area; each wind turbine comprising a tower, a generator system for generating electric power and a rotor provided with a number of rotor blades on a rotor axis coupled to the electric generator for driving the generator, the rotor being arranged on the tower;

the method comprising:

- providing a wind turbine farm control for controlling operational parameters for each of the wind turbines;
- providing a measurement or a prediction of a vertical wind shear profile located above a level of the rotors of the wind turbines;
- based on a value of the measured or predicted vertical wind shear profile determining an adjustment of one or more operational parameters for each of the wind turbines such that a yield of electric power of the wind turbine farm is optimized with respect to the measured or predicted vertical wind shear profile, and
- adapting the operational parameters of the one or more wind turbines according to the adjustment.

Based on measuring or predicting the vertical wind shear profile, adjustment of the wind turbine farm control settings is performed to improve the overall energy capture from the wind. To that effect, the wind turbine farm control adjustments are directed to change the operational parameters of individual wind turbines. These include, but are not limited to the induction of the wind turbine and the yawing angle.

Additionally, the invention relates to a controller arrangement for controlling operational parameters of a wind turbine farm comprising a plurality of wind turbines arranged together in a wind turbine farm area; each wind turbine comprising a tower, a generator system for generating electric power and a rotor provided with a number of rotor blades on a rotor axis coupled to the electric generator for driving the generator, the rotor and electric generator being arranged on the tower, wherein the controller arrangement is coupled to operational controls of each of the wind turbines and comprises at least one processor, in which the processor is configured to:—receive a measurement or a prediction of a vertical wind shear profile located above a level of the rotors of the wind turbines; —based on a value of the measured or predicted vertical wind shear profile determine an adjustment of the operational parameters for each of the wind turbines such that a yield of electric power of the wind turbine farm is optimized with respect to the measured or predicted vertical wind shear profile, and—after transmitting the operational parameters to the respective operational controls, adapt the operational parameters of one or more of the wind turbines according to the adjustment.

Furthermore, the invention relates to a wind turbine farm comprising a plurality of wind turbines arranged together in a wind turbine farm area; each wind turbine comprising a tower, a generator system for generating electric power and a rotor provided with a number of rotor blades on a rotor axis coupled to the generator system for driving the generator system, the rotor being arranged on the tower, wherein the wind turbine farm is provided with a controller arrangement as described above or the wind turbine farm is operated by a method as described above.

Also, the invention relates to controller software comprising instructions for execution by at least one processor of a controller arrangement of a wind turbine farm, which instructions after being loaded enable the processor to:—receive a measurement or a prediction of a vertical wind shear profile located above a level of the rotors of the wind turbines; —based on a value of the measured or predicted vertical wind shear profile determine an adjustment of one or more operational parameters for each of the wind turbines such that a yield of electric power of the wind turbine farm is optimized with respect to the measured or predicted vertical wind shear profile, and—adapt the operational parameters of the one or more wind turbines according to the adjustment.

Advantageous embodiments are further defined by the dependent claims.

BRIEF DESCRIPTION OF DRAWINGS

The invention will be explained in more detail below with reference to drawings in which embodiments of the invention are shown. The drawings are intended exclusively for illustrative purposes and not as a restriction of the inventive concept. The scope of the invention is only limited by the definitions presented in the appended claims.

In any of the drawings, an item with a same reference number refers to a same or similar item in the other drawings.

DESCRIPTION OF EMBODIMENTS

In operation, during exposure to a wind field, the wind turbines of a wind turbine farm capture energy from the flow. As explained above in the section 'Background', in prior art wind turbine farms the energy capture may not be optimal due to application of design rules that assume a standard vertical wind shear profile of the wind field and that disregard occurrence of any non-standard wind shear profile and/or a 'blockage' effect.

Figure 4:
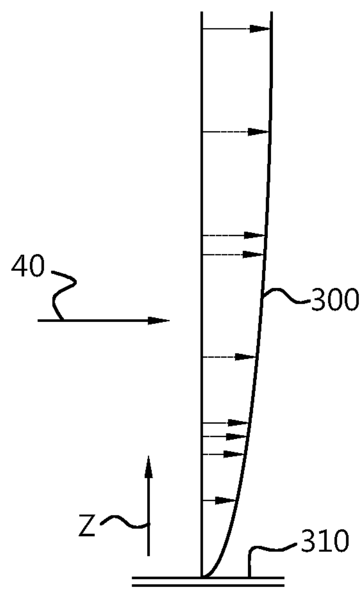
FIG. 4 schematically shows an example of a wind shear profile for undisturbed wind.

A vertical wind shear profile relates to the variation of the wind shear in the vertical direction above the earth's surface. In FIG. 4 an illustration of a standard wind shear profile is shown.

The blockage effect occurs when the wind turbine farm forms an obstacle to the wind field and causes the deflection of the wind over and around the wind turbine farm area. This effect is observable by measuring the vertical wind shear profile (or its characteristics) above at least the wind turbine farm area.

Thus, to overcome inefficient energy capture due to the occurrence of a non-standard wind shear profile or a 'blockage' effect, the invention provides a method for measurement or prediction of the vertical wind shear profile upwind from and/or above the wind turbine farm area.

Figure 1:
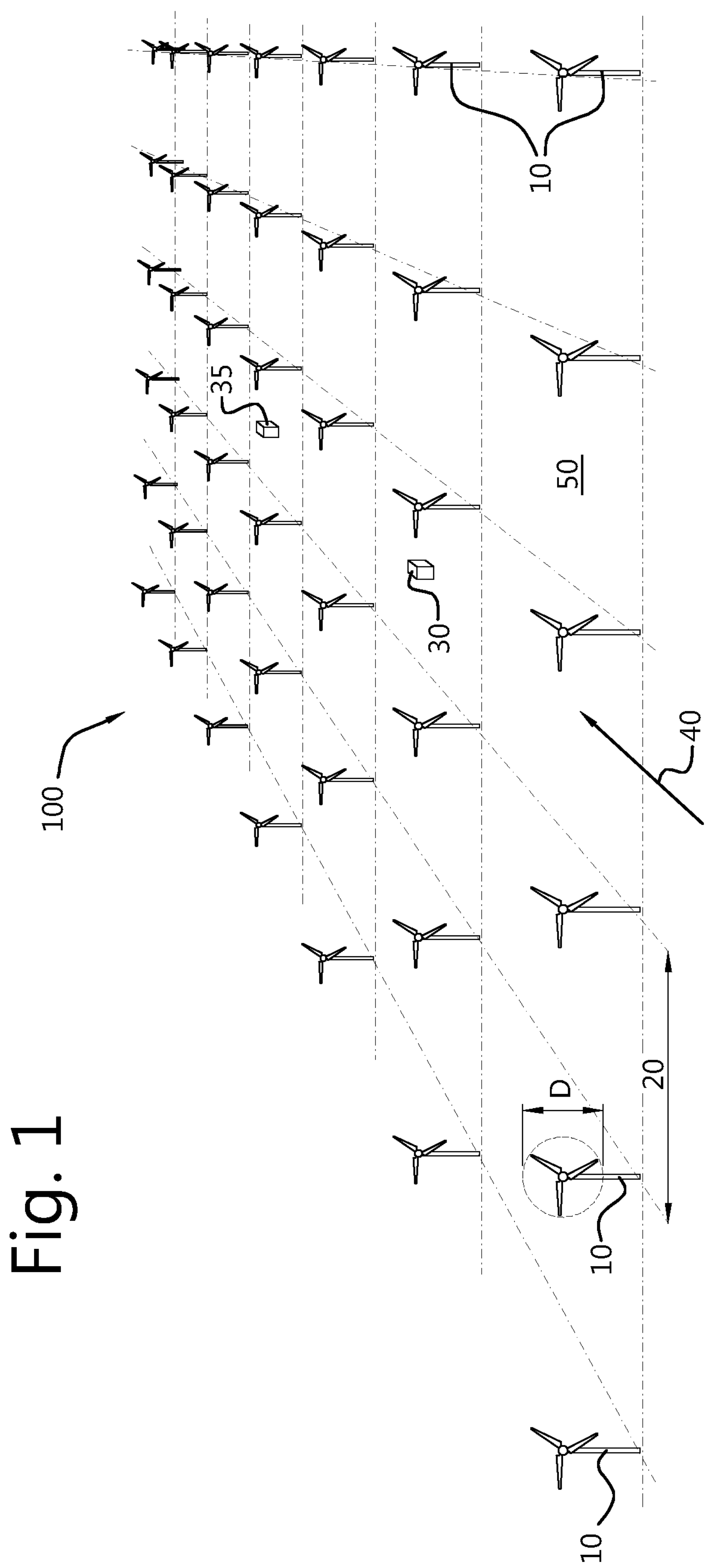
FIG. 1 schematically shows a wind turbine farm comprising a plurality of wind turbines according to an embodiment of the invention.

FIG. 1 schematically shows a wind turbine farm 100 comprising a plurality of wind turbines 10 in accordance with an embodiment of the invention.

A wind turbine farm 100 typically comprises a plurality of wind turbines 10 that are arranged within a wind turbine farm area 50. The wind turbines are located in the wind turbine farm area can be spaced apart at predetermined intervals, for example in a rectangular grid such that any pair of neighbouring wind turbines in the farm area are spaced apart at a distance 20 of multiple times the rotor diameter D of a wind turbine. Other arrangements of wind turbines within the wind turbine farm are also possible, including also an irregular arrangement of wind turbines within the wind turbine farm area.

According to the invention, the wind turbine farm 100 is equipped with means for measuring a vertical wind shear profile at the location of the wind turbine farm. In an embodiment, the wind turbine farm is provided with a light detection and ranging, LIDAR, system 30 which is arranged, within or nearby the wind turbine farm, to probe a wind field component in vertical direction of a wind field 40 above the wind turbine farm for measurement or prediction of the vertical wind shear profile.

The LIDAR system 30 can be located within the wind turbine farm area 50, such that a view of the wind field 40 above the area is obtained. The LIDAR system 30 can be either ground based or be positioned at a level equal to or comparable with the top of the wind turbine 10 (e.g., the average level of the nacelle of the wind turbines).

According to an embodiment, the measurement of the vertical wind shear profile or wind shear measurement to predict the vertical wind shear profile is performed within the wind turbine farm area 50 or nearby. In a further embodiment, the method involves that measurements are performed up to about 20 km from the wind turbine farm 100 in upwind direction and upto a height of about 20 rotor diameters D above the wind turbine farm.

As described above, the method comprises that the measurement or prediction of the vertical wind shear profile is carried out by probing the wind field 40 in vertical direction above the wind turbine farm for measurement or prediction of the vertical wind shear profile. In this respect, measuring or predicting the vertical wind shear profile is to be construed as deriving the vertical wind shear profile from characteristics measured on the wind field above the wind turbine farm in vertical direction.

In an embodiment, the LIDAR system 30 can be arranged additionally to probe the wind field 40 in front (i.e., the upwind direction) of and/or around the wind turbine farm area 50 to determine the blockage effect and/or the wind shear effect. In an embodiment, the LIDAR system is configured as a scanning LIDAR system, which allows to measure over a relatively larger area above and/or around the wind turbine farm area.

Alternatively or additionally, to using the LIDAR system, the method may comprise the measurement or prediction of the vertical wind shear profile by means of wind measurements by a RADAR (radio detection and ranging) based system 35 within or nearby the wind turbine farm area.

The method for measuring or predicting a vertical wind shear profile located above a level of the rotors of the wind turbines 10 comprises additional control steps:

a step of determining an adjustment of operational parameters for each of the wind turbines based on a value of the measured or predicted vertical wind shear profile such that a yield of electric power of the wind turbine farm is optimized with respect to the measured or predicted vertical wind shear profile, and a step of adapting the operational parameters of the one or more wind turbines according to the adjustment.

According to an embodiment, the method comprises that the adjustment is determined as a function of a wind direction across the wind turbine farm.

Optionally, the method comprises a step for controlling the wind turbine farm to adjust at least a setting of an axial induction of individual wind turbines based on the measured or predicted vertical wind shear profile to counteract the non-standard wind shear profile or the 'blockage' effect. According to an embodiment, the method may comprise determining the adjustment for a setting of the axial induction, and adapting the setting of the axial induction of the one or more wind turbines according to the adjustment. This will be described in more detail below.

The wind turbines 10 are each adjustable by means of one or more operational parameters in order to achieve an optimal efficiency under certain arbitrary operational conditions.

The operational parameters of a wind turbine are related to settings for the various parts of the wind turbine, comprising the rotor assembly, the rotor blades, the yawing system and the generator system settings. According to an embodiment, the method comprises that the operational parameters are adapted by pitching the rotor blades and/or adjusting of a rotor speed. In a further embodiment, the method comprises that the operational parameters are adapted by individual pitch control of each of the rotor blades for adjusting the axial induction over the plane of the rotor. Also, the method may comprise determining the adjustment for a setting of the yaw angle, and adapting the setting of the yaw angle of the one or more wind turbines according to the adjustment.

This will be explained in more detail with reference to FIG. 3.

Figure 2:
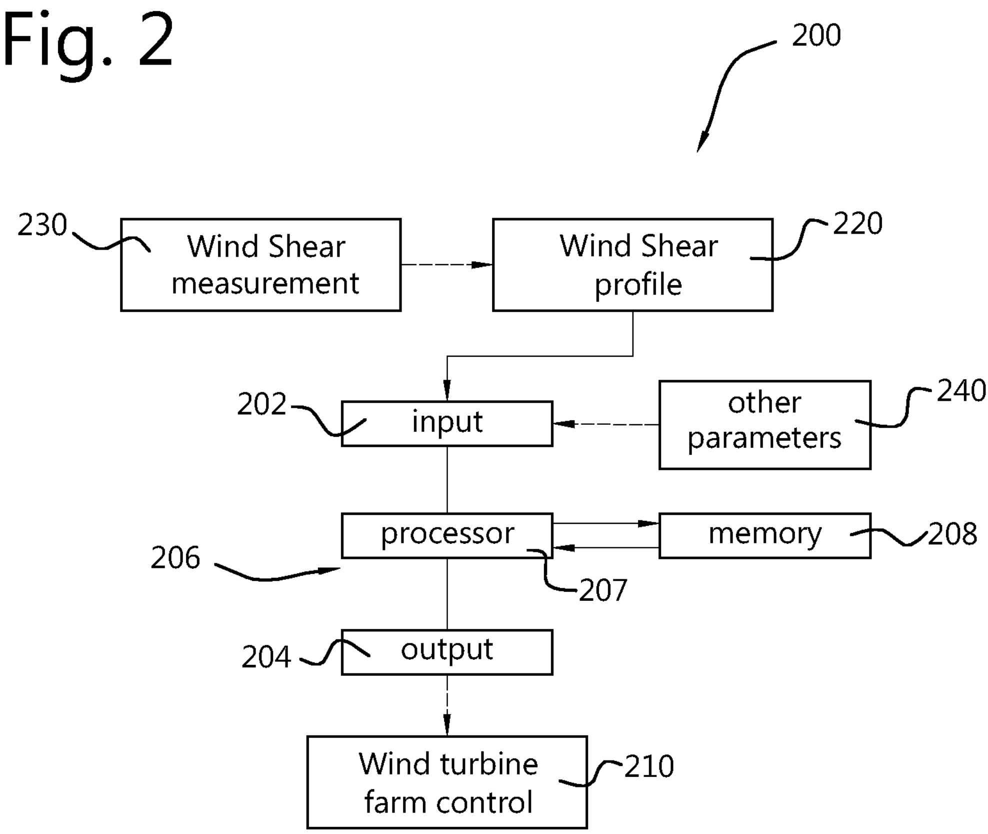
FIG. 2 schematically shows a controller arrangement for controlling operational parameters of one or more wind turbines according to an embodiment of the invention.

FIG. 2 schematically shows a controller arrangement 200 for controlling operational parameters of one or more wind turbines according to an embodiment of the invention.

The controller arrangement comprises an input 202, an output 204, a processing unit 206, in which the input is connected to the processing unit for providing the input signal, the processing unit 206 which comprises at least one processor 207 coupled to a memory 208, is connected to the output 204. The output is arranged with connections with a wind turbine farm controller or to individual wind turbine controllers 210.

The controller arrangement 200 is set up to receive at the input an input signal that relates to the measured or predicted wind shear profile 220 obtained from a wind shear profile providing service or from a measurement system 230 that measures a vertical wind speed profile, and is configured to adjust the operational parameters of one or more wind turbines in order to optimize the energy capture from the wind turbine farm in accordance with the measured or predicted wind shear profile. At the same time, the adjustment of the operational parameters may involve that the blockage effect is reduced by creating a larger wind flow through the wind farm.

The input may be arranged to receive some operational data 240 from the wind turbine farm for use in the optimization process.

Accordingly, the controller arrangement comprises communication facilities that provide functionality for communication with local controllers 210 of individual wind turbines and may be local ("on-site") or remote ("off-site") relative to the wind turbine farm area 50.

Vertical wind shear is a variation of the horizontal wind component over a vertical distance. In the evaluation of the yield of wind turbines and wind farms usually only the 'Normal wind profile' is considered. The wind profile 300 denotes the average wind speed as a function of height z above ground level 310. A general approach is to assume that the normal wind speed profile is described by a power law such that $V(z)=V_T(z/z_T)^\alpha$ where V(z) is the wind speed at height z, $V_T$ the wind speed at the height of the turbine, $z_T$ is the height of the turbine, and a is the exponent.

According to the invention, a measured vertical wind speed profile can be compared with the model to detect any indication of blockage or wind shear. If such indication is observed, the energy capture by wind turbines 10, in particular positioned in the upstream direction in the wind turbine farm 100, can be adjusted (i.e., reduced) to obtain a higher wind speed in the downstream region of the wind turbine farm.

As a result of the reduced energy capture in the upstream region of the wind turbine farm, the blockage can be reduced. Reducing blockage allows more energy to enter the boundaries of the wind turbine farm. Adjusting to the wind shear allows the wind farm to adjust (within limits) the energy recovery from wind flowing over the wind turbine farm area 50.

The measured or predicted vertical wind shear profile is thus communicated to controller arrangement 200 coupled to the wind turbine farm controller 210 or the controller 210 of individual wind turbines in the wind turbine farm area 50 to adjust the operational parameters thereof in a manner that the energy capture from the wind field 40 by the wind turbine farm 100 as a whole is enhanced by taking into account the actual vertical wind shear profile and optionally also the actual blockage effect.

It is noted that the controller arrangement 200 may include other control functions for the wind turbine farm or individual wind turbines that will be known the skilled in the art and therefore will not be described here.

In an embodiment, the input 202 ports of the controller arrangement 200 are configured to receive signals from the measurement or prediction system that represent at least parameters indicative of the vertical wind shear profile. Additionally, the signals may correspond with parameters indicative of the blockage effect and/or the wind field in upwind direction and/or around the wind turbine farm area. The output ports 204 are arranged for connection to the controller 210 of the wind turbine farm or the operational control of each individual wind turbine 10 and for transmitting data to the respective controller for control of the operational parameters of the respective wind turbine.

The processor 207 is configured by means of an algorithm to carry out a controller function. First the processor is arranged to receive the signals from the input ports 202. Based on the received signals the processor is arranged to determine the parameters relating to the vertical wind shear profile and optionally the blockage effect. Based on the parameters relating to at least the vertical wind shear profile the processor is further configured to determine adjustments of the operational parameters of individual wind turbines 10 for improving the overall energy capture of the wind turbine farm 100. Finally, the processor communicates the adjustments to the controller 210 of each individual wind turbine by transmission of adjustment signals over the output ports. In an embodiment, the controller arrangement is also capable of adjusting a yaw angle of individual wind turbines 10 to overall energy capture of the wind turbine farm in relation to the wind shear profile and/or 'blockage' effect.

The algorithm to be executed on the at least one processor is embodied in instructions for the processor to carry out in order to perform the controller function.

The instructions may be provided on a data storage medium for downloading to the memory 208 coupled to the at least one processor 207.

As will be appreciated, the controller arrangement 200 may be arranged for connecting to output devices such as a display, input devices such as a keyboard, network communication devices, external storage devices, etc., as known in the art.

Alternatively or additionally, the controller arrangement may be configured to adapt an axial induction of one or more wind turbines 10 in the wind turbine farm 100 by adjusting their operational parameters as explained above.

The axial induction (indicated a) of the wind turbine is defined as the fractional reduction of the wind shear at the rotor of the wind turbine by the rotor extracting energy, perpendicular to the rotor. In the theoretical case of maximum energy extraction by an actuator disc in a flow-tube, the axial induction a is equal to ⅓. Following from the axial induction, an axial force is defined as the force in the rotor shaft direction exerted by the wind on the turbine. In this theoretical case, the axial force ($F_{ax}$) is associated with the axial induction a via the relationship $F_{ax}=4a(1-a)F_{norm}$, where $F_{norm}$ is a force that is used for normalisation. This force is equal to $\frac{1}{2}\rho V^2 A$, where ρ is the density of air, V the undisturbed wind shear and A the rotor surface area that is traversed. If the rotor surface area and the density are known, the axial induction can therefore be determined from measurement of the axial force and the wind shear. In reality, the axial induction varies over the rotor, but a rotor average induction may be defined as $a=(V-V_r)/V$, where V is the undisturbed wind shear at hub height and $V_r$ is the axial wind shear in the rotor plane, averaged over the rotor. The axial force is can then be defined as the resultant of the aerodynamic forces on the rotor in the horizontal plane, in the direction of the main shaft of the wind turbine.

Figure 3:
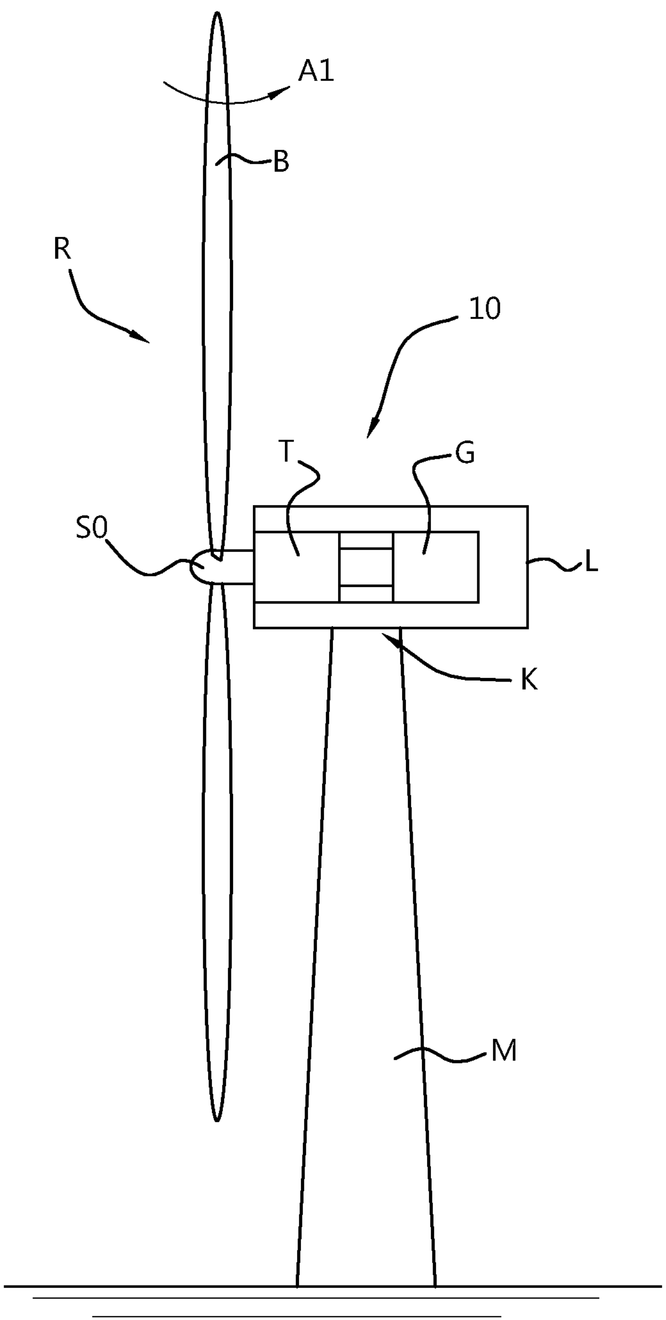
FIG. 3 schematically shows a wind turbine.

FIG. 3 shows a schematic view of a wind turbine 10 according to an embodiment of the invention. Wind turbine 10 comprises a rotor R with a rotor shaft S0 provided with a number of rotor blades B. The rotor R having a rotor diameter D is coupled to a transmission T for attaching the rotor shaft to a generator system comprising an electric generator G by means of the rotor shaft. The electric generator G is provided with an output for the output of electrical energy, for example through a power converter (not shown) to an electricity network. The assembly of rotor R, transmission T and electric generator G is located in a nacelle L on a tower M. The assembly of rotor R, transmission T and electric generator G is pivotally connected to the tower M by means of a yaw bearing K that constitutes part of a yaw system. It will be understood that the transmission T may be excluded when the rotor shaft is coupled directly to the generator, i.e. in the case of a low-speed generator.

The operational parameters that can be controlled by the controller arrangement are related to the parts R, B, Y, K, G shown and mentioned here in FIG. 3. Pitch angles, rotor speed and yaw angles define the behaviour in the rotor plane for a horizontal axis wind turbine, pitch angles may be time-varying and azimuth dependent. To control the rotor speed, the pitch angle and generator torque can be varied. Also the transmission ratio may be varied. By adjusting the operational parameters of any of the parts R, B, Y, K, G, the interaction between the wind turbine 10 and the wind field 40 at the location of the wind turbine can be modified leading to a local change in the local wind flow. By controlling the operational parameters of multiple wind turbines 10 in the wind turbine farm 100 the wind field 40 within the wind turbine farm area 50 may be adapted.

In an embodiment, the operational parameters may involve a setting of the axial induction of one or more wind turbines. Accordingly, an adjustment for the setting of the axial induction is determined, and the setting of the axial induction of the one or more wind turbines is adapted according to the adjustment.

In an embodiment, the operational parameters may involve control of the rotor R and/or rotor blades B, where the operational parameters are adapted by pitching A1 the rotor blades B and/or adjusting of a rotor speed according to the determined adjustment.

In a further embodiment, the operational parameters are adapted by individual pitch control of each of the rotor blades for adjusting the axial induction over the plane of the rotor.

In an embodiment, the operational parameters may involve control of the yaw system by means of the yaw angle K in which the method comprises determining the adjustment for a setting of the yaw angle from the measured or predicted vertical wind shear profile, and adapting the setting of the yaw angle of the one or more wind turbines according to the adjustment.

In an embodiment, the wind turbine 10 is coupled to a remote generator system (not shown) which comprises an electric generator driven by pressurized fluid from a hydraulic pressurized fluid line. In the embodiment the rotor of the wind turbine is coupled to a torque pump which in use produces pressurized fluid to energize an hydraulic drive coupled to the electric generator.

FIG. 4 schematically shows an example of a standard wind shear profile 300 for undisturbed wind in which the wind shear varies according to a power law as a function of height z relative to the ground level 310 of the wind turbine farm. Accordingly, at ground level the wind shear is minimal and approaches a maximum constant speed at higher altitude. As described above, in practice the shape of the vertical wind shear profile may differ from the this ideal shape in various manners.

The invention has been described with reference to some embodiments. Obvious modifications and alterations will occur to the person skilled in the art upon reading and understanding the preceding detailed description. It is intended that the invention be construed as including all such modifications and alterations insofar as they come within the scope of the appended claims.

The invention claimed is:

1. A method for operating a wind turbine farm comprising a plurality of wind turbines arranged together in a wind turbine farm area; each wind turbine of the plurality of wind turbines comprising a tower, a generator system for generating electric power and a rotor provided with a number of rotor blades on a rotor axis coupled to the generator system for driving an electric generator, the rotor being arranged on the tower; the method comprising:

providing a wind turbine farm control for controlling operational parameters for each of the wind turbines of the plurality of wind turbines;

executing a probe of a wind field of the wind turbine farm area;

providing a measurement or a prediction of a vertical wind shear profile located above a level of the rotors of the plurality of wind turbines based on the probe of the wind field;

based on comparing a value of the measured or predicted vertical wind shear profile to a wind shear profile model, determining an obstacle and an adjustment of one or more operational parameters for each of the wind turbines of the plurality of wind turbines;

adapting the one or more operational parameters of each of the wind turbines of the plurality of wind turbines according to the adjustment, such that the operational parameters modify an interaction between each of the wind turbines and the wind field to overcome a blockage effect of the obstacle and optimize a yield of electric power of the wind turbine farm with respect to the measured or predicted vertical wind shear profile.

2. The method according to claim 1, wherein the one or more operational parameters comprise one or more of an axial induction, a rotor speed, a rotor blade angle, a yaw angle and transmission settings of each of the wind turbines of the plurality of wind turbines.

3. The method according to claim 1, wherein the method further comprises providing a measurement or a prediction of a wind turbine farm blockage effect on an upwind side of the wind turbine farm and/or at one or more locations around the wind turbine farm area.

4. The method according to claim 3, wherein the measured or predicted vertical wind shear profile is combined with the measured or predicted wind turbine farm blockage effect.

5. The method according to claim 1, wherein the measurement of the vertical wind shear profile is performed by means of light detection and ranging (LIDAR) measurement.

6. The method according to claim 5, wherein the LIDAR measurement is a scanning LIDAR measurement.

7. The method according to claim 5, wherein one or more LIDAR measurement devices are positioned within the wind turbine farm area, optionally above the level of the rotors.

8. A controller arrangement for controlling operational parameters of a wind turbine farm comprising a plurality of wind turbines arranged together in a wind turbine farm area; each wind turbine of the plurality of wind turbines comprising a tower, a generator system for generating electric power and a rotor provided with a number of rotor blades on a rotor axis coupled to the generator system for driving an electric generator, the rotor and electric generator being arranged on the tower, wherein the controller arrangement is coupled to operational controls of each of the wind turbines of the plurality of wind turbines and comprises at least one processor and a memory including instructions thereon, in which the instructions executed by the at least one processor are configured to:

execute a probe of a wind field of the wind turbine farm area;

receive a measurement or a prediction of a vertical wind shear profile located above a level of the rotors of the plurality of wind turbines based on the probe of the wind field;

based on comparing a value of the measured or predicted vertical wind shear profile to a wind shear profile model, determine an obstacle and an adjustment of the operational parameters for each of the wind turbines of the plurality of wind turbines;

and after transmitting the operational parameters to the respective operational controls, adapt the operational parameters of each of the wind turbines of the plurality of wind turbines according to the adjustment, such that the operational parameters modify an interaction between each of the wind turbines and the wind field to overcome a blockage effect of the obstacle and optimize a yield of electric power of the wind turbine farm is optimized with respect to the measured or predicted vertical wind shear profile.

9. The controller arrangement according to claim 8, wherein the operational parameters comprise one or more of an axial induction and a yaw angle.

10. The controller arrangement according to claim 8, wherein the measurement of the vertical wind shear profile is received from at least one light detection and ranging (LIDAR) measurement device.

11. The controller arrangement according to claim 10, wherein the at least one LIDAR measurement device is positioned within a distance of about 40 km or less from the wind turbine farm area.

12. The controller arrangement according to claim 8, wherein the prediction of the vertical wind shear profile is derived or estimated from meteorological measurements and/or from indirect measurements such a sea roughness, ambient temperature, or wind shear measurements outside of the wind farm area.

* * * * *